INVENTOR
F. K. BECKER
BY J. P. Kearns
ATTORNEY 3,315,171

DIGITALIZED TRANSVERSAL FILTER

Floyd K. Becker, Colts Neck, N.J., assignor to Bell Telephone Laboratories, Incorporated, New York, N.Y., a corporation of New York Filed Dec. 24, 1963, Ser. No. 333,030

8 Claims. (Cl. 328—163)

This invention relates to transversal filter equalizers and in particular to digitalization of such filters.

In an ideal transmission system the received signal is an exact replica of the transmitted signal. In any practical system, however, the received signal differs from the transmitted signal due to imperfections in the transmission medium. The lack of uniform gain and linear delay over the frequency band of the system constitutes a common form of imperfection. Distortions due to gain and delay imperfections are often so severe as to require equalization.

A form of equalizer often used with wide-band transmission systems is the transversal equalizer. Basically, this form of equalizer consists of a delay line with equally spaced taps and means for independently controlling the amount of signal fed through each of the taps to a summing circuit. The input signal is fed into one end of the delay line which is properly terminated at the other end to prevent reflections. The center tap is fed to the summing circuit and forms the main transmission path.

One disadvantage of this form of equalizer is the construction of the delay line from discrete matched coils and capacitors. Another disadvantage is the design problem encountered when attempting to maintain uniform delay between taps over a band of frequencies. Further, an independent operational amplifier or multiplier must be provided for each tap on the delay line, except possibly the center tap.

It is an object of this invention to overcome the disadvantages of the delay line type of transversal equalizer by the use of digital circuits.

It is another object of this invention to replace the delay line in known transversal equalizers with a clock-controlled binary countdown chain.

It is a further object of this invention to centralize the weighting function associated with the digitalized equalizer about a single operational amplifier.

According to this invention, these objects are accomplished by first applying weighting functions to an unequalized input signal according to the corrections necessary in adjacent sampling time slots to obtain the wave shape desired as though a delay line were being used. Next, samples of the weighted input signal are gated sequentially into separate accumulators until each accumulator contains a complete set of samples. Finally the accumulated totals are read out sequentially to a common output. An equalized output signal is thus obtained in each sampling interval which is exactly equivalent to what would have been obtained by sampling the output of a properly adjusted delay line equalizer.

The sampling times are controlled by an accurate clock generator whose output is counted down in a binary chain to provide sequencing pulses. The sequencing pulses control an array of gating circuits interconnecting the weighting multipliers to the accumulators. The sampling times are now precisely controlled from a common source and no longer depend on an iterative delay line whose individual sections are relatively difficult to match in practice.

This invention will be better understood from a consideration of the following detailed specification together with the drawings in which.

Figure 1:
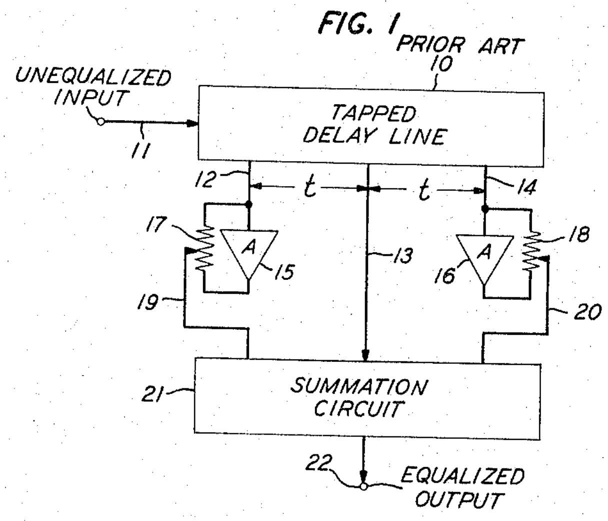
FIG. 1 depicts the prior art tapped delay line transversal equalizer.

In FIG. 1 is shown a tapped delay line transversal equalizer of the prior art having three taps, such as described, for example, by B. C. Bellows and R. S. Graham in the Bell System Technical Journal, volume 36, No. 6, of November 1957, at page 1433. The unequalized signal incoming on line 11 is dispersed in time in the delay line 10 which has taps equally spaced at the Nyquist sampling interval (half the period of the highest frequency of significant magnitude in the waveshape to be corrected). Delay line 10 is assumed to be properly terminated to preclude reflections. There are an odd number of taps 12, 13 and 14. The center tap is assumed to carry the main signal and no correction is applied to its output. Tap 12 carries a leading echo and its output is multiplied by a factor between plus and minus one in operational amplifier 15. The position of the movable tap on potentiometer 17 determines the corrected output on lead 19. Similarly, the output on tap 14 represents a lagging echo, which can be corrected in operational amplifier 16 shunted by potentiometer 18. The corrected lagging output appears on lead 20. The outputs on center tap 13 and leads 19 and 20 are added together in the summation circuit 21 to produce a reshaped and equalized output at terminal 22.

In the event that echoes displaced farther than one Nyquist interval from the center tap are of significance, additional taps symmetrically spaced from the center tap may be provided as is well known. The transversal equalizer operates in the time domain in contradistinction to frequency domain equalizers. Frequency domain equalizer networks are designed to transform the frequency domain characteristics of an actual transmission medium to those of an ideal medium. Time domain equalizers are fully adjustable and can be set to compensate for both delay and amplitude distortion. The settings of the multiplying potentiometers can be determined by observation of the unequalized output resulting when a known signal is transmitted and adjusting the multiplying potentiometers until the received signal resembles the known signal.

Figure 2:
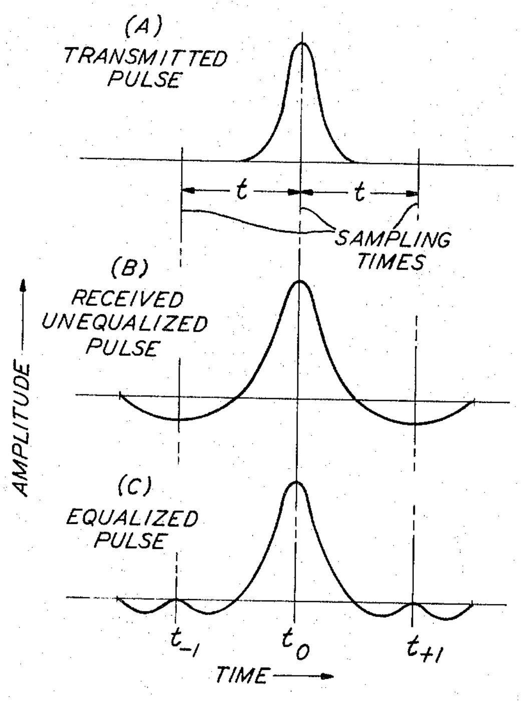
FIG. 2 is a waveform diagram illustrating the pulse shaping typically effected by a transversal equalizer.

FIG. 2 illustrates in part (A) a typical transmitted test pulse. Part (B) shows in exaggerated form a corresponding received pulse. The received pulse includes lagging and leading echoes of the original signal which alter the shape of the received wave from that of the transmitted wave. Through the medium of the transversal equalizer the received pulse can be reshaped in any desired manner to produce, for example, the pulse of part (C) in which the distortion present at sampling times $t_{-1}$ and $t_{+1}$ is reduced to non-interfering proportions by proper adjustment of the multipliers at the lagging and leading outputs of the tapped delay line.

The delay line equalizer of the prior art is cumbersome, expensive and difficult to construct of lumped coils and capacitors in the typical bridged-T network configuration. It is important that the delay time between taps be precisely uniform and that the delay between each tap and the summation circuit be uniform as well so that the equalizer does not introduce any additional distortion.

Figure 3:
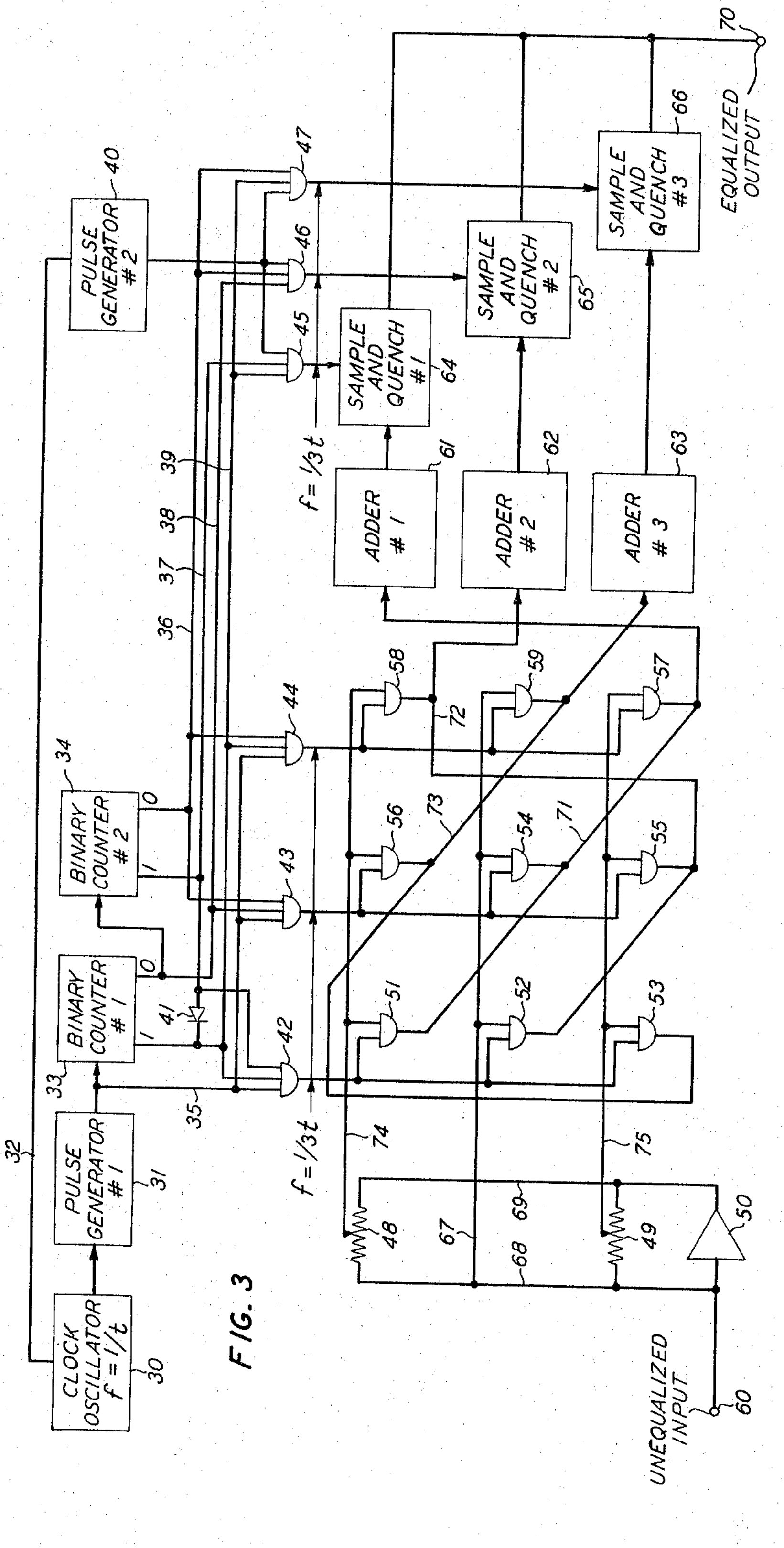
FIG. 3 is a block schematic diagram of the improved digitalized transversal equalizer according to this invention.

To overcome these disadvantages the digital transversal equalizer of FIG. 3 is proposed. Here the sampling times are determined in real time by a precise clock oscillator 30, which may be crystal controlled or, in the alternative, synchronized with the received signal by any well known technique. Clock 30 operates at a frequency equal to the reciprocal of the desired sampling interval, i.e., $f=1/t$. Oppositely phased outputs are applied to a first pulse generator 31 and over a line 32 to a second pulse generator 40. Each pulse generator produces a pulse at the appropriate positive-going or negative-going zero crossings of the appropriate clock output. Monostable multivibrators serve this function well.

A pair of tandem-connected binary counters 33 and 34 are driven by the output of pulse generator 31. Counters 33 and 34 are advantageously bistable multivibrators having a single input and complementary outputs labeled "1" and "0." The zero output of counter 33 drives counter 34. A countdown of four would normally be expected from counters 33 and 34 except for the feedback from the "one" output of counter 34 to the "one" output of counter 33 through diode 41. This feedback has the effect of deleting one count per cycle from the overall countdown, as is well known. See, in this connection, Chapter 11 of Pulse and Digital Circuits, by Millman and Taub (McGraw-Hill Book Company, Inc., New York, 1956). Therefore, the countdown is effectively three, rather than four.

The one and zero outputs of the two counters 33 and 34 and the output of generator 31 on lead 35 are combined in coincidence gates 42, 43 and 44 in such a way that each gate produces an output in sequence at a frequency one-third that of clock 30. The interval between successive individual outputs is, of course, at the sampling interval. The output from generator 31 on lead 35 causes each gate output to be a precisely timed narrow pulse.

The one and zero outputs of counters 33 and 34 are also conducted over leads 36 through 39 to another trio of coincidence gates 45 through 47. The output of generator 40 is also applied in such a manner that these gates produce sequential outputs at an overall frequency one-third that of the clock. The output from generator 40 is in phase opposition to the output from generator 31.

The unequalized input at terminal 60 is applied to operational or inverting amplifier 50. Distribution lines 68 and 69 are connected respectively to the input and output of amplifier 50. Bridged between these lines are multiplying potentiometers 48 and 49. Positioning of the taps on these potentiometers determines the correction factors in the range of plus and minus one by which the input signals appearing on leads 74 and 75 are multiplied, as with the individual amplifier multipliers in series with the taps on the delay line of FIG. 1. Lead 67, representing the path for the main signal, is connected directly to lead 68 and therefore the signal on this lead is not attenuated, but can be considered as being multiplied by a factor of one.

By means of coincidence or AND gates 51 through 59 the several outputs from the operational amplifier are directed sequentially under the control of timing gates 42 through 44 to adders or accumulators 61 through 63 in a manner to be described. The accumulated totals in adders 61 through 63 are sampled sequentially one each sampling interval in sample and quench circuits 64 through 66. These circuits are enabled by the outputs of timing gates 45 through 47. The outputs of the sample and quench circuits are delivered to a common output terminal 70.

Operational amplifier 50 can advantageously be a common emitter transistor amplifier shunted from collector to base by the multiplier potentiometers. Gates 51 through 59 can be implemented by transistors with the timing gate output applied to the base and the adjusted input signal applied to the emitter. Adders 61 through 63 are storage capacitors, each having a common input from three of the sampling gates. Sample and quench circuits 64 through 66 can each be single transistors with base electrodes connected to the timing outputs, emitters connected to the storage capacitors and collectors connected in common to a potential source and to output terminal 70.

In the operation of the improved transversal equalizer, gates 51 through 59 are enabled under the control of timing gates 42 through 44 in sequence and in groups of three. An enabled gate of each group of three is connected to a different adder. Thus, gates 51, 52 and 53 are enabled simultaneously by timing gate 42 at one sampling instant to store in adders 61 through 63 the outputs on leads 74, 67 and 75 in that order. In the next sampling instant gates 54, 55 and 56 are enabled simultaneously to store in adders 61 thorugh 63 the outputs on leads 67, 75 and 74 in that order. In the third sampling instant gates 57, 58 and 59 are simultaneously enabled to store in adders 61 through 63 the outputs on leads 75, 74 and 67 in that order.

Gates 51 through 59 may be thought of as forming a three-by-three matrix as shown in FIG. 3. They feed into adders 61 through 63 in sequence successive samples of the corrected outputs of operational amplifier 50 so that at the end of three sampling intervals adder 61 contains the same information as summation circuit 21 in FIG. 1 at a first sampling instant. For this purpose diagonal lead 71 connects the outputs of distribution gates 51, 54 and 57 to adder number one. Gates 51, 54 and 57 are enabled at successive sampling instants. At the end of the fourth sampling interval adder 62 contains the same information as summation circuit 21 at a second sampling interval. Diagonal lead 72 joining the outputs of distribution gates 52, 55 and 58 to adder number two assures this. Finally, at the end of a fifth sampling interval adder 63 contains the same information as summation circuit 21 at the end of a third sampling interval. Outputs of distribution gates 53, 56 and 59 are connected to adder number three for this purpose. Thereafter, adders 61 through 63 contain samples of a reshaped input signal in successive sampling intervals. Timing gates 45 through 47 enable, in succession, sample and quench circuits 64 through 66 half a sampling interval after adders 61 through 63 fill up, i.e., contain three samples. Sample and quench circuits 64 through 66 feed the contents of adders 61 through 63, in sequence, to terminal 70. At this time also the storage elements in the adders are quenched. It is apparent from the foregoing description that the transfer function of the digitalized transversal equalizer is the same in real time as that of the delay line equalizer.

While this invention has been described in connection with a specific embodiment in which a single leading and lagging echo are compensated, it will be apparent to those skilled in the art that its principles can readily be extended to any odd order equalizer by providing $n-1$ multipliers, a countdown of $n$, $2n$ timing gates, $n$ adders, $n$ sample and quench circuits, and $n^2$ distribution gates.

What is claimed is:

1. Apparatus for equalizing the distortion imparted to a pulsed signal of multifrequency content by the traversal of a transmission medium comprising a source of signals, including said transmission medium, having substantial spectral components extending over a plurality $n$ of sampling intervals $t$, an operational amplifier driven by said signal source, a plurality $n-1$ of weighting dividers shunting said amplifier, each divider being adjusted relative to the peak of a signal from said source to cause the outputs thereof when added to yield an equalized output substantially free of distortion, a plurality $n^2$ of gates arranged in a square matrix of rows and columns and connected to the outputs of said dividers row-by-row, a clock circuit having outputs for enabling said gates in sequence column-by-column at intervals $t$, a plurality of summing circuits driven by said gates under the control of said clock circuit to store over a fixed period of time $nt$ an equalized representation of a signal from said source, and a plurality $n$ of sampling circuits having an input connected to each summing circuit in turn and an output connected to a common output point for said apparatus, said sampling circuits also being enabled sequentially by said clock circuit at intervals $t$.

2. A system for equalizing a time varying signal subjected to the phase distorting effects of traversing a real transmission medium comprising:

means for multiplying said distorted signal by a plurality of predetermined correcting factors to provide a plurality of time varying product signals;

a first accumulator for providing a first signal proportional to the sum of signals applied thereto;

means for sequentially applying said plurality of said product signals to said first accumulator; and means for periodically quenching said first accumulator.

3. A system for equalizing a signal as defined in claim 2 wherein said predetermined correcting factors are in the range from plus 1 to minus 1.

4. Apparatus according to claim 2 in which said product signal applying means is a plurality of two input AND gates each of which has a single output.

5. A transversal equalizer for distorted electric wave signals comprising means for selectively multiplying said electric wave signal by a plurality of corrective factors including unity to produce a plurality of samples such that successive sums of said samples dispersed in time result in an undistorted output signal, timing means for establishing uniform sampling time intervals related to the half period of the highest significant frequency in said electric wave signals, a plurality of adders for accumulating totals of the amplitudes of samples from said multiplying means, a square matrix of gating circuits arranged in rows and columns, means for connecting the outputs of said gating circuits lying on each of the plurality of mutually parallel diagonals taken in the same direction to the plurality of adders, means for applying the plurality of samples from said multiplying means to inputs of gating circuits in successive rows, means for enabling said gating circuits column-by-column in successive time intervals controlled by said timing means, said adders thereby accumulating over successive pluralities of timing intervals a full complement of amplitude samples selected by said multiplying means, a plurality of sampling circuits connected to sample said totals accumulated in said adders, means under the control of said timing means for enabling said sampling circuits sequentially, and means for connecting said sampling circuits to a common output terminal at which an equalized electric wave appears.

6. The apparatus according to claim 5 in which said multiplying means comprises an inverting amplifier having an input point and an output point, and a plurality of tapped resistors, shunted from input point to output point of said amplifier.

7. The apparatus according to claim 5 in which said timing means comprises tandem connected bistable multivibrators each having a complementing input and complementary outputs with a feedback connection from a lower order to a higher order counter to effect an odd-ordered overall counting cycle, and a plurality of coincidence gates selectively connected to the complementary outputs of said multivibrators to effect sequential gate enablement.

8. A system for equalizing a time varying signal subjected to the phase distorting effects of traversing a real transmission medium comprising:

means for multiplying said distorted signal by a plurality of predetermined correcting factors to provide a plurality of time varying product signals;

a first accumulator for providing a first signal proportional to the sum of signals applied thereto;

means for sequentially applying samples of said product signals to said first accumulator;

a second accumulator for providing a second signal proportional to the sum of signals applied thereto;

means for sequentially applying samples of said product signals to said second accumulator in the same sequence and at the same time that samples of said product signals are applied to said first accumulator, a different product signal being applied to said first and second accumulators at any time; and means for sequentially sampling said first signal and said second signal to produce an equalized output signal derived from said distorted signals.

References Cited by the Examiner

UNITED STATES PATENTS 2,908,874 10/1959 Pierce ------------ 333—28 X

DAVID J. GALVIN, *Primary Examiner.*

ARTHUR GAUSS, *Examiner.*

J. ZAZWORSKY, *Assistant Examiner.*